US008213036B2

(12) United States Patent
Ishii

(10) Patent No.: US 8,213,036 B2
(45) Date of Patent: Jul. 3, 2012

(54) DISTRIBUTION SYSTEM FOR SCAN IMAGE DATA AND VALIDATING THE SCAN IMAGE DATA

(75) Inventor: Yuuichi Ishii, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 911 days.

(21) Appl. No.: 12/041,273

(22) Filed: Mar. 3, 2008

(65) Prior Publication Data

US 2008/0218791 A1 Sep. 11, 2008

(30) Foreign Application Priority Data

Mar. 7, 2007 (JP) .................................. 2007-057886

(51) Int. Cl.
*G06F 3/12* (2006.01)
*G06F 15/16* (2006.01)
*G06K 15/00* (2006.01)
*H04N 1/04* (2006.01)

(52) U.S. Cl. ...................... 358/1.15; 358/1.13; 358/1.14; 358/1.16; 358/474; 709/202; 709/203; 709/208; 709/209; 709/231; 709/232

(58) Field of Classification Search ............................ None
See application file for complete search history.

(56) References Cited

U.S. PATENT DOCUMENTS

| 7,052,190 | B2 | 5/2006 | Ishii et al. | |
|---|---|---|---|---|
| 2004/0233471 | A1* | 11/2004 | Inoue et al. | 358/1.14 |
| 2005/0257126 | A1* | 11/2005 | Hagiuda et al. | 715/500 |
| 2006/0077420 | A1* | 4/2006 | Okamoto et al. | 358/1.14 |
| 2006/0165459 | A1 | 7/2006 | Ishii | |

FOREIGN PATENT DOCUMENTS

| JP | 6-233043 | A | 8/1994 |
|---|---|---|---|
| JP | 2000-050000 | | 2/2000 |
| JP | 2001-326743 | A | 11/2001 |
| JP | 2002-84308 | A | 3/2002 |
| JP | 2003-032425 | | 1/2003 |
| JP | 2003032425 | * | 1/2003 |
| JP | 2004-070719 | | 3/2004 |
| JP | 2005-208934 | | 8/2005 |

OTHER PUBLICATIONS

Ikeda Yasuyuki; "Document Distribution Processing Device and Program"; JP Pub Date Aug. 2005; Machine translation in english for JP Pub No. 2005-208934.* Ikeda Yasuyuki; "Document Distributing . . . And program"; JP Pub Date Aug. 2008; Machine Translation in English of JP Pub No. 2005-208934.*
Hayashi Takahiko; "Distribution System for Scan Image Data"; JP Pub Date Jan. 2003; Machine Translation in English of JP Pub No. 2003-032425.*

* cited by examiner

*Primary Examiner* — Benny Q Tieu
*Assistant Examiner* — Haris Sabah
(74) *Attorney, Agent, or Firm* — Dickstein Shapiro LLP

(57) ABSTRACT

A disclosed information processing device connected to an image forming device having a distribution destination setting unit setting a distribution destination of image data scanned by a scanning unit includes: a distribution procedure storage unit storing a distribution procedure for each distribution destination of the image data; a validation information storage unit storing validation information for validating the image data; an image information obtaining unit obtaining the image data and destination information set in the image data from the image forming device; a validation unit validating the image data obtained by the image information obtaining unit using the validation information stored in the validation information storage unit; and a distribution performing unit distributing, based on a result of validation by the validation unit, the image data in accordance with the distribution procedure for the destination information obtained by the image information obtaining unit.

19 Claims, 9 Drawing Sheets

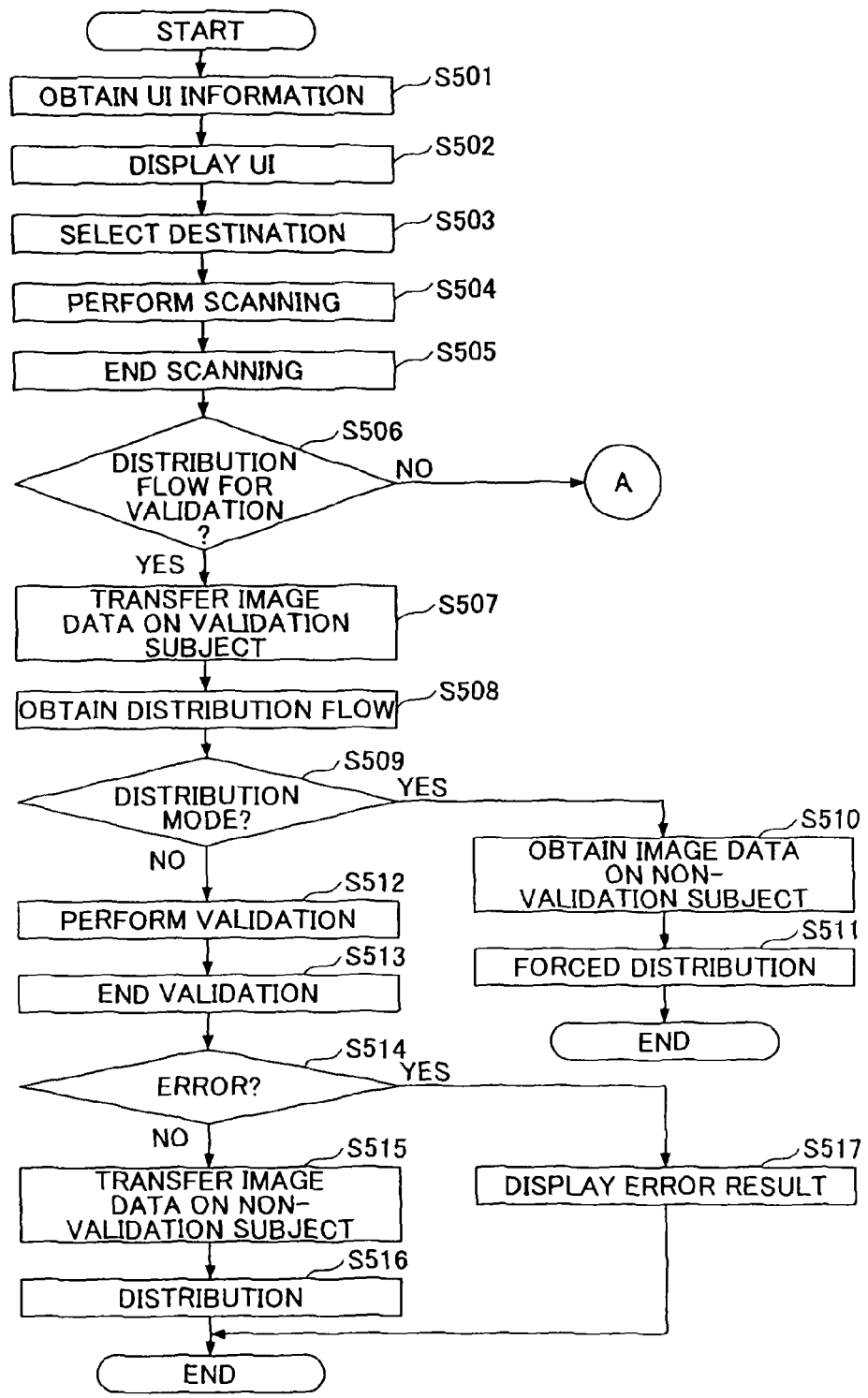

DISTRIBUTION SYSTEM FOR SCAN IMAGE DATA AND VALIDATING THE SCAN IMAGE DATA

BACKGROUND OF THE INVENTION

1. Field of the Invention

The present invention relates to an information processing device, image forming device, information processing method, and information processing program for distributing image data.

2. Description of the Related Art

In a distribution system for distributing image data using an image forming device with a scanning function and the like, various types of image data are distributed in a specified method. The distribution system is constituted using a distribution server device managing distribution of image data, client terminal, and the like connected via a network in addition to the image forming device.

In the distribution system, when a paper document is scanned in the image forming device and image data is created, the image data is distributed from the distribution server device to the client terminal. In the image forming device constituting the distribution system, information on a distribution destination of image data is stored. When the distribution destination is selected and the paper document is scanned in the image forming device, the image data and the information on a distribution destination are transmitted to the distribution server device. In the distribution server device, when the image data and the information on a distribution destination are received, on the basis of the distribution destination of image data included in the information on a distribution destination and an output method of image data, the image data is distributed to the distribution destination in the specified method.

In the following, a conventional distribution system is described on the basis of a case where image data is distributed via electronic mail. In this case, the distribution destination indicates an electronic mail address and the output method is electronic mail. Accordingly, the distribution server device transmits the image data to a selected electronic mail address via electronic mail. In addition, examples of the output method of image data in image data distribution include print output, output to a file server device, and the like.

Further, in this distribution system, when an error is generated upon distributing the image data for some reasons such as erroneous input of a distribution destination and the like, a message indicating that the error is generated is displayed on an operation panel of the image forming device, for example. In this case, a user is capable of distributing the image data again by setting the distribution destination and scanning the paper document again.

As techniques using an image forming device with a scanning function, Patent Document 1 discloses a system of distributing scanned image data, for example, providing a rational unit in which digital image data obtained by a scanning device is usable in terms of image data management and charging management in a remote server. Further, Patent Document 2 discloses image data storage and distribution techniques in which link information on image data is distributed instead of accumulated image data per se so as to substantially reduce data amount to be distributed, thereby improving reliability and operability of distribution.

Patent Document 1: Japanese Laid-Open Patent Application No. 2003-32425

Patent Document 2: Japanese Laid-Open Patent Application No. 2004-70719

However, in the above-mentioned conventional techniques, when dealing with image data created by scanning a paper document and the like in which data for each of various types of items is input, it is impossible to validate whether data is appropriately input in each item from the image data.

Further, in the above-mentioned conventional techniques, when a distribution error is generated, it is necessary to set the distribution destination again and operation is complicated.

SUMMARY OF THE INVENTION

It is a general object of the present invention to provide an improved and useful information processing device, image forming device, information processing method, and information processing program in which the above-mentioned problems are eliminated.

A more specific object of the present invention is to provide an information processing device, image forming device, information processing method, and information processing program that can validate whether data for each data item included in image data is appropriately input before image data distribution.

According to the present invention, there is provided an information processing device connected to an image forming device having a distribution destination setting unit setting a distribution destination of image data scanned by a scanning unit, the information processing device comprising: a distribution procedure storage unit storing a distribution procedure for each distribution destination of the image data; a validation information storage unit storing validation information for validating the image data; an image information obtaining unit obtaining the image data and destination information set in the image data from the image forming device; a validation unit validating the image data obtained by the image information obtaining unit using the validation information stored in the validation information storage unit; and a distribution performing unit distributing, based on a result of validation by the validation unit, the image data in accordance with the distribution procedure for the destination information obtained by the image information obtaining unit.

According to the above-mentioned structure, it is possible to validate whether data for each item of data included in the image data is appropriately input before distributing the image data.

According to another aspect of the present invention, there is provided an image forming device connected to an information processing device validating image data, comprising: a destination information storage unit storing destination information on the image data scanned by a scanning unit; a distribution destination setting unit setting, from the destination information stored in the destination information storage unit, a distribution destination of the image data scanned by the scanning unit; a validation subject judgment unit judging whether the image data is a subject of validation in the information processing device based on the set destination information; and a transmission unit transmitting the image data and the destination information on the image data to the information processing device when the image data is judged to be the subject of validation by the validation subject judgment unit.

According to the above-mentioned structure, it is possible to transmit image data to be validated to the information processing device, so that it is possible to validate whether data for each item of data included in the image data is appropriately input before distributing the image data.

According to the present invention, it is possible to validate whether data for each item of data included in the image data is appropriately input before distributing the image data.

Other objects, features and advantage of the present invention will become more apparent from the following detailed description when read in conjunction with the accompanying drawings.

BRIEF DESCRIPTION OF THE DRAWINGS

FIG. 5 is a flowchart showing operation of a distribution system including an image forming device and an information processing device according to a first embodiment;

DETAILED DESCRIPTION OF THE PREFERRED EMBODIMENTS

In the following, embodiments of the present invention will be described with reference to the accompanying drawings.

In an image forming device according to the present invention includes a distribution destination setting unit setting information on a distribution destination of scanned image data and a validation subject judging unit judging whether the image data is a subject of validation. When the image data is judged to be such a validation subject, the image data and the information on a distribution destination are transmitted to an information processing device.

In the information processing device according to the present invention, when the image data and the information on a distribution destination are obtained, the information processing device validates the image data. Then, based on a result of the validation, the information processing device distributes the image data in a distribution method for the distribution destination.

First Embodiment

Figure 1:
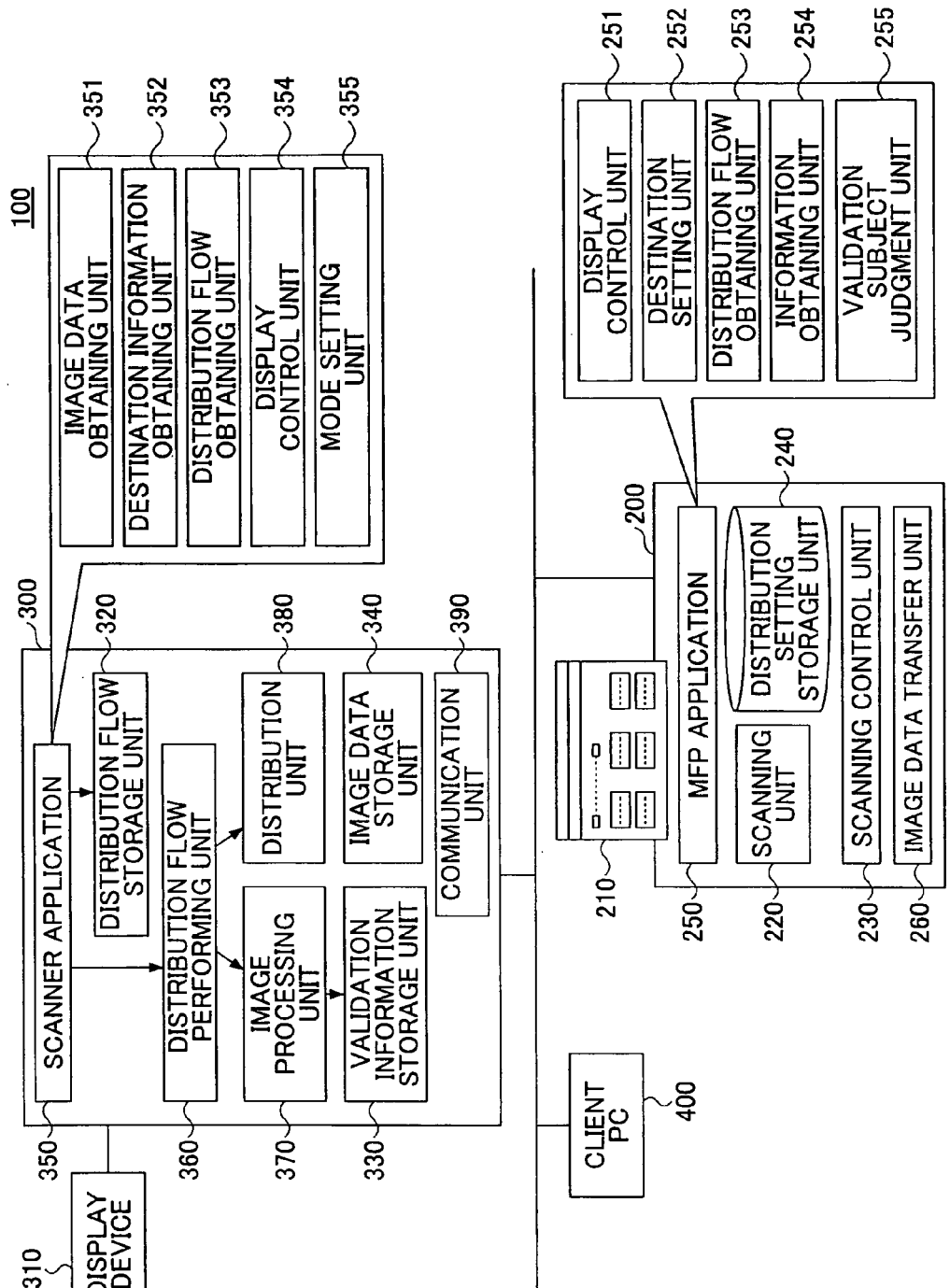
FIG. 1 is a diagram showing a functional configuration of an image forming device and an information processing device constituting a distribution system according to a first embodiment.

In the following, a first embodiment of the present invention is described with reference to the drawings. FIG. 1 is a diagram showing a functional configuration of an information processing device 300 and an image forming device 200 in the first embodiment constituting a distribution system 100.

The distribution system 100 is constructed using the image forming device 200, the information processing device 300, and a client terminal 400 connected via a network. The image forming device 200 employs a multifunction device with a scanning function. The information processing device 300 functions as a distribution management server device managing distribution of image data scanned in the image forming device 200. The client terminal 400 is specified as a distribution destination of image data scanned in the image forming device 200, for example. The client terminal 400 is realized by a general computer.

In the distribution system 100, a paper document is scanned to create image data in the image forming device 200. Further, information on a distribution destination of the image data is set and transferred to the information processing device 300. The information processing device 300 obtains the image data and the information on a distribution destination set in the image data from the image forming device 200. The information processing device 300 performs validation as a process for validating the image data, and then distributes the image data to a specified distribution destination.

In the following, the image forming device 200 and the information processing device 300 constituting the distribution system 100 are described.

First, the image forming device 200 is described.

The image forming device 200 according to the present embodiment includes an operation panel 210, a scanning unit 220, a scanning control unit 230, a distribution setting storage unit 240, an MFP application 250, and an image data transfer unit 260.

The operation panel 210 has an operation function for operating the image forming device 200 and a display function for displaying a result of processing performed in the image forming device 200 and a device status of the image forming device 200. The operation panel 210 may be realized using a touch panel, for example. The scanning unit 220 reads a paper document and generates image data. The scanning control unit 230 controls operation of the scanning unit 220.

The distribution setting storage unit 240 stores information on a distribution destination of the image data in advance, the image data being generated by scanning in the scanning unit 220. The MFP application 250 is a program for realizing each of various types of functions included in the image forming device 200. The destination information and a function of the MFP application 250 will be described in detail later. The image data transfer unit 260 transfers the image data, destination information set in the image data, and a distribution flow obtained based on the destination information from the image forming device 200 to the information processing device 300. The distribution flow will be described in detail later.

In the following, the above-mentioned destination information and the function of the MFP application 250 are described. First, the destination information is described.

The destination information refers to various types of information relating to a distribution destination of image data generated by scanning in the scanning unit 220. The various types of information relating to a destination include an address to which image data is distributed, bibliographic information on image data, information indicating whether image data is a subject of validation, and the like. The validation of image data will be described in detail later.

In the image forming device 200 according to the present embodiment, the destination information is registered in advance by an administrator of the distribution system 100 or the like and stored in the distribution setting storage unit 240. Further, the distribution setting storage unit 240 of the image forming device 200 may store display layout information for displaying a list of distribution destinations on the operation panel 210 in addition to the destination information.

Next, the MFP application 250 is described in the following.

The MFP application 250 includes a display control unit 251, a destination setting unit 252, a distribution flow obtaining unit 253, an information obtaining unit 254, and a validation subject judgment unit 255. These units correspond to the functions realized in the MFP application 250.

The display control unit 251 reads the display layout information from the distribution setting storage unit 240 and displays the list of distribution destinations of image data on the operation panel 210 in a selectable manner. The destination setting unit 252 sets the destination information as information on a destination of image data, the destination information corresponding to the distribution destination selected from the list of distribution destinations displayed on the operation panel 210. The distribution flow obtaining unit 253 obtains the distribution flow corresponding to the destination information from a distribution flow storage unit 320 of the information processing device 300 in accordance with the destination information set in the destination setting unit 252. The validation subject judgment unit 255 judges whether to perform validation of image data in accordance with the distribution flow obtained by the distribution flow obtaining unit 253. The information obtaining unit 254 obtains information relating to a result of the validation of image data performed in the information processing device 300 from the information processing device 300. The information obtaining unit 254 will be described in detain in a second embodiment.

Figure 2:
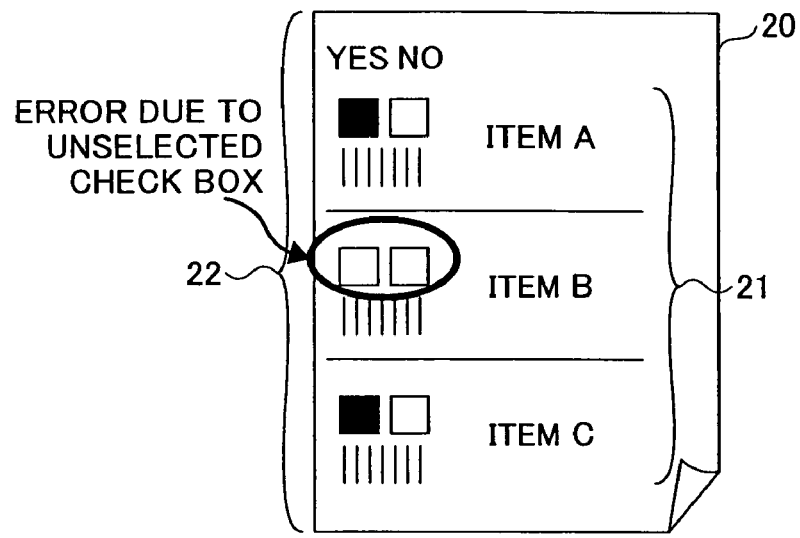
FIG. 2 is a diagram showing validation in a distribution system.

In the following, validation in the distribution system 100 is described with reference to FIG. 2. FIG. 2 is a diagram showing the validation in the distribution system 100.

The validation in this case is described using image data 20 shown in FIG. 2 as an example. The image data 20 is an example of image data when a paper document in which information for each of predetermined items is input is scanned. Accordingly, the image data 20 includes item data 21 indicating the item and data 22 for an item as information input for the item.

The validation of the present embodiment validates whether the item data 21 matches the data 22 for an item. In the validation of the present embodiment, when the data 22 for an item is blank for the item data 21 or a data format of the data 22 for an item does not match the item data 21, a process result is generated as an error because the item data does not match the data for an item.

In the image forming device 200 according to the present embodiment, whether image data is to be handled as a subject of validation is determined in accordance with a distribution destination of image data. In the image forming device 200 according to the present embodiment, when the distribution destination is a destination to which image data having consistency is required to be distributed, for example, the image data may be handled as the subject of validation. Or when image data is processed and used for an arithmetic operation later, for example, image data may be handled as the subject of validation.

Next, the information processing device 300 is described with reference to FIG. 1.

The information processing device 300 according to the present embodiment performs validation of image data using the image data and destination information obtained from the image forming device 200 and distributes image data in accordance with a distribution procedure based on a result of the validation. The information processing device 300 may be realized by installing a program for realizing a function in the information processing device 300 according to the present embodiment on a general computer having an arithmetic processing unit such as a CPU (Central Processing Unit) and a storage device such as a memory.

The information processing device 300 includes a display device 310, the distribution flow storage unit 320, a validation information storage unit 330, an image data storage unit 340, a scanner application 350, a distribution flow performing unit 360, an image processing unit 370, a distribution unit 380, and a communication unit 390.

The display device 310 employs a liquid crystal display, for example, and may be connected to the information processing device 300 in an appropriate manner or may be integrated with the information processing device 300. In the distribution flow storage unit 320, the distribution flow is stored as a distribution procedure for distributing image data for each distribution destination of image data. In the information processing device 300, the distribution flow is registered and stored in advance by the administrator of the distribution system 100, for example. The distribution flow will be described in detail later.

In the validation information storage unit 330, validation information used upon performing validation of image data is stored. The validation information in the information processing device 300 of the present embodiment includes information relating a combination of item data and data for an item assumed to be matched and information relating to item data configured to issue no error when data for the item is blank.

With reference to FIG. 2, the validation information is described in detail. In the example of the image data 20 shown in FIG. 2, the data 22 for an item matched with the item data 21 is alternative data in which one of "Yes" and "No" is selected. Accordingly, in the validation information storage unit 330, the item data 21 and alternative data are tied and stored as the combination of item data and data for an item assumed to be matched. Further, in the example of the image data 20, the item data 21 may be stored in the validation information storage unit 330 as item data configured to issue an error for a validation result when the data 22 for an item is blank.

In the image data storage unit 340, image data obtained from the image forming device 200 is stored. The scanner application 350 is a program for realizing various types of functions relating to image data distribution in the information processing device 300. The scanner application 350 will be described in detail later. The distribution flow performing unit 360 controls performing relating to the distribution flow. The image processing unit 370 performs an image process necessary for distribution in accordance with the distribution flow and validation on image data handled as a subject of validation. The image processing unit 370 will be described in detail later.

The distribution unit 380 performs an output process on image data subjected to the necessary image process in the image processing unit 370 in an output method for a specified distribution destination. In the output process of this case, the output method of image data is electronic mail transmission when the distribution destination of image data indicates an electronic mail address, for example. Accordingly, the output process in this case is for attaching the image data subjected to the image process to an electronic mail and transmitting the image data. Further, when the distribution destination of image data indicates a file server, the output method of image data is file transmission. Accordingly, the output process in this case is for transmitting the image data in a file format, the image data having been subjected to the process in the image processing unit 370.

The communication unit 390 controls communication between the information processing device 300 and an external device connected to the information processing device 300. In the present embodiment, the communication unit 390 communicates with the image forming device 200 in particular.

In the following, the above-mentioned scanner application 350 is described in detail.

The scanner application 350 includes an image data obtaining unit 351, a destination information obtaining unit 352, a distribution flow obtaining unit 353, a display control unit 354, and a mode setting unit 355. The elements described above constitute functions realized by the scanner application 350.

The image data obtaining unit 351 obtains image data transmitted from the image forming device 200. The destination information obtaining unit 352 obtains the destination information set in the image data in the image forming device 200. The distribution flow obtaining unit 353 obtains the distribution flow transmitted from the image forming device 200. And the display control unit 354 controls display in the display device 310.

The mode setting unit 355 sets a distribution mode of the distribution flow performing unit 360. The distribution flow performing unit 360 is provided with a validation mode for performing validation and a distribution performing mode for distributing image data without performing validation. In the mode setting unit 355, one of the validation mode and the distribution performing mode is set for the distribution flow performing unit 360. This setting may be determined in advance by the administrator of the distribution system 100, for example.

Figure 3:
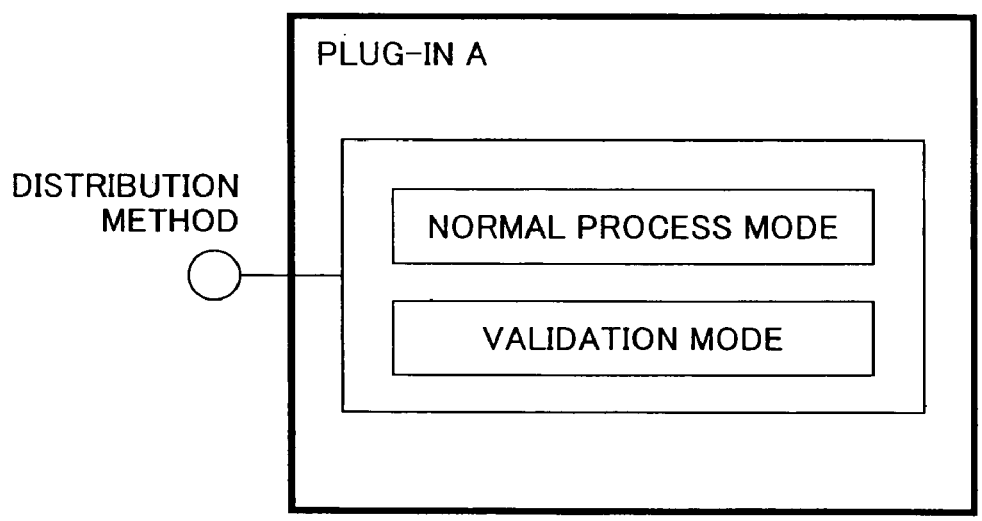
FIG. 3 is a diagram showing an image processing unit in an information processing device according to a first embodiment.

Next, the image processing unit 370 according to the present embodiment is described with reference to FIG. 3. FIG. 3 is a diagram showing the image processing unit 370 in the information processing device 300 according to the first embodiment.

The image processing unit 370 of the information processing device 300 according to the present embodiment is constituted using plural plug-ins for performing various types of image processes on image data. Each plug-in performs an image process on image data so as to perform distribution in accordance with the distribution flow. Specifically, the plug-ins performs an OCR process for converting image data to text data, converts image data to a PDF file, and the like.

The plug-ins constituting the image processing unit 370 according to the present embodiment are provided with a normal process mode for performing a normal image process so as to distribute image data and a validation mode for performing validation on image data as shown in FIG. 3. In the plug-ins constituting the image processing unit 370 according to the present embodiment, each plug-in may be provided with the normal process mode and the validation mode. Further, in the image processing unit 370 according to the present embodiment, those plug-ins simply performing an arithmetic operation, for example, may be provided with no validation mode.

In the information processing device 300 according to the present embodiment, when plug-ins executed upon performing distribution in accordance with the distribution flow include a plug-in provided with the validation mode, validation is performed even when image data is not a subject of validation.

Figure 4:
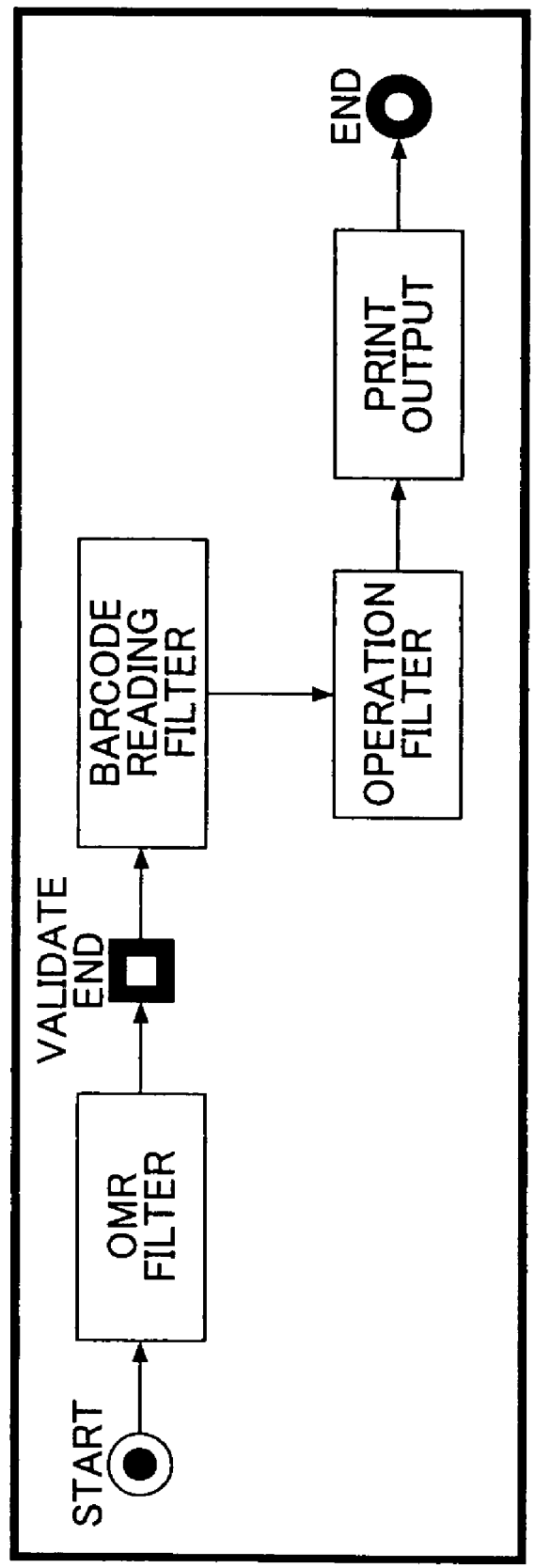
FIG. 4 is a diagram showing a flow of distribution in a distribution system.

Next, the above-mentioned distribution flow is described with reference to FIG. 4. FIG. 4 is a diagram showing the distribution flow in the distribution system 100.

The distribution flow in the present embodiment refers to a flow of an image process performed on image data so as to distribute image data to a specified distribution destination.

FIG. 4 is an example of the distribution flow when image data generated by scanning a mark sheet is distributed as an account. In this case, in the image forming device 200, destination information is set as "print output as an account" upon scanning the mark sheet.

In accordance with this, the image process flow performed so as to distribute image data to a print output unit (plotter unit) as a distribution destination includes a process for reading a filled portion in the mark sheet, a process for reading a bar code identifying the mark sheet, a process for creating an account using a result of an arithmetic operation of read data, and a process for printing the account.

The image processing unit 370 according to the present embodiment is provided with plug-ins for performing each of these processes. Accordingly, in the image processing unit 370, by successively flowing image data to an OMR (Optical Mark Reader) reading plug-in for reading a mark sheet, a bar code reading plug-in, an arithmetic operation plug-in, and a print output plug-in, it is possible to distribute the image data to a distribution destination set as "print output as an account".

In the information processing device 300 according to the present embodiment, the distribution flow as shown in FIG. 4 is determined in advance for each distribution destination and stored in the distribution flow storage unit 320. In addition to the example shown in FIG. 4, for a distribution destination set as "store in a file server", for example, a distribution flow including "a process for converting image data to a PDF file and a process for transmitting the PDF file to a file server" may be stored in the distribution flow storage unit 320.

Next, operation of the distribution system 100 including the image forming device 200 and the information processing device 300 according to the present embodiment is described with reference to FIG. 5. FIG. 5 is a flowchart showing the operation of the distribution system 100 including the image forming device 200 and the information processing device 300 according to the first embodiment.

When image data is distributed in the distribution system 100, in the image forming device 200, the display control unit 251 obtains display layout information for displaying a list of distribution destinations from the distribution setting storage unit 240 (S501). Then, the display control unit 251 displays the list of distribution destinations on the operation panel 210 using the display layout information (S502). On the operation panel 210, a distribution destination of image data is selected by a user from the displayed list of distribution destinations. When the distribution destination of image data is selected, the MFP application 250 sets the distribution destination as the distribution destination of image data using the destination setting unit 252 and obtains a distribution flow for the distribution destination from the distribution flow storage unit 320 (S503).

In the image forming device 200, when the distribution destination of image data is set, the scanning control unit 230 causes the scanning unit 220 to perform a scanning process (S504). When a notification notifying that the scanning is completed is received (S505) in the image forming device 200, the MFP application 250 judges whether the distribution flow obtained in S503 is a distribution flow in which validation is performed using the validation subject judgment unit 255 (S506).

In S506, if the distribution flow obtained in S503 is judged by the validation subject judgment unit 255 to be a distribution flow in which validation is performed, the image data transfer unit 260 transfers the image data to be handled as a subject of validation, destination information, and distribution flow to the information processing device 300 (S507).

In the image forming device 200 according to the present embodiment, information relating to a page number of the image data handled as a subject of validation is also obtained as information for specifying image data handled as a subject of validation. Further, in the image forming device 200 according to the present embodiment, an identification number specific to the image forming device 200 for specifying the image forming device 200 is also transferred to the information processing device 300 in S507 together with the image data handled as a subject of validation. In this case, the identification number may be a serial number of the image forming device 200, for example.

In S506, if the distribution flow obtained in S503 is judged by the validation subject judgment unit 255 to be a distribution flow in which validation is not performed, a process described later with reference to other drawing is performed.

In the information processing device 300, the scanner application 350 obtains the image data using the image data obtaining unit 351 and obtains the destination information using the destination information obtaining unit 352. When the scanner application 350 obtains the image data and the destination information, the scanner application 350 obtains the distribution flow transmitted from the image forming device 200 using the distribution flow obtaining unit 353 (S508).

In the information processing device 300, the scanner application 350 detects whether the distribution performing mode is set for the distribution flow performing unit 360 (S509). In S509, if the distribution performing mode is set for the distribution flow performing unit 360, the scanner application 350 obtains image data not handled as a subject of validation from the image forming device 200 using the image data obtaining unit 351 (S510). Then, the scanner application 350 performs forced distribution on the image data using the distribution flow performing unit 360 without performing validation (S511).

In S509, if the distribution performing mode is not set for the distribution flow performing unit 360, namely, if the validation mode is set for the distribution flow performing unit 360, various types of plug-ins constituting the image processing unit 370 are called as the validation mode and validation is performed on the image data (S512).

In the following, validation in the information processing device 300 according to the present embodiment is described.

The validation in the image processing unit 370 of the information processing device 300 according to the present embodiment validates whether item data and data for an item included in the image data obtained by scanning in S504 are matched in comparison with the validation information stored in the validation information storage unit 330. Specifically, each plug-in constituting the image processing unit 370 performs the comparison. If the item data and data for an item included in the image data are validated to be matched, the image processing unit 370 is assumed to have appropriately performed validation on the image data. Further, if the item data and data for an item included in the image data are validated to be mismatched, the image processing unit 370 handles a result of the validation on the image data as an error.

In the information processing device 300 according to the present embodiment, it is possible to set an end point of validation in the distribution flow. In the example shown in FIG. 4, for example, an end of validation is set as a step after the OMR reading process is performed in the OMR reading plug-in.

The distribution flow performing unit 360 calls each plug-in constituting the image processing unit 370 in the validation mode until a flag of a validation end indicating the end point of validation is detected. The distribution flow performing unit 360 ends the validation upon detecting the flag of the validation end (S513).

When the end point of validation is set in the distribution flow as one step of the image process, the distribution flow performing unit 360 according to the present embodiment does not call a normal distribution mode of each plug-in unless the validation normally ends.

In this case, if the result of the validation is not an error (S514), the scanner application 350 in the information processing device 300 obtains image data not handled as a subject of validation from the image forming device 200 using the image data obtaining unit 351 (S515). In this case, in the information processing device 300, whether the image data not handled as a subject of validation is image data generated in the same job as in the image data handled as a subject of validation is judged on the basis of the identification information on the image forming device 200 obtained together with the image data handled as a subject of validation and destination information in S507.

When the image data is obtained in the information processing device 300, the distribution flow performing unit 360 distributes the image data not handled as a subject of validation and the image data handled as a subject of validation in accordance with the distribution flow (S516). Then, the information processing device 300 transmits information indicating that the validation has normally ended to the image forming device 200 via the communication unit 390 and ends the distribution process of image data.

In this case, while the information processing device 300 performs validation, the image data not handled as a subject of validation is temporality stored in a storage device included in the image forming device 200, the storage device being not shown in the drawings. Further, in the information processing device 300, the image data after the validation is temporarily stored in the image data storage unit 340.

In S512, if the result of the validation is an error, the validation result is transmitted from the information processing device 300 to the image forming device 200 via the communication unit 390. When the validation result is received in the image forming device 200, the MFP application 250 causes the display control unit 251 to display the result on the operation panel 210 (S517).

In accordance with the above-mentioned operation, the distribution system 100 including the image forming device 200 and the information processing device 300 according to the present embodiment, it is possible to perform validation on image data before distributing the image data.

In addition, in the flowchart shown in FIG. 5, a time when the information processing device 300 obtains the image data not handled as a subject of validation is after the validation. However, the time is not limited to this. For example, the information processing device 300 may obtains the image data not handled as a subject of validation while performing the validation.

In this case, in the information processing device 300, a request for transferring the image data not handled as a subject of validation may be transmitted to the image forming device 200 via the communication unit 390 when the distribution flow performing unit 360 calls each plug-in in the validation mode.

In the image forming device 200, upon receiving the transfer request, the image data transfer unit 260 transfers the image data not handled as a subject of validation to the information processing device 300. In the information processing device 300, the image data obtaining unit 351 may obtain the image data not handled as a subject of validation while performing the validation and store the image data in the image data storage unit 340 until the validation ends.

In this manner, in the information processing device 300, it is possible to reduce a period of time until distribution of image data is completed by obtaining image data not handled as a subject of validation during the validation.

Figure 6A:
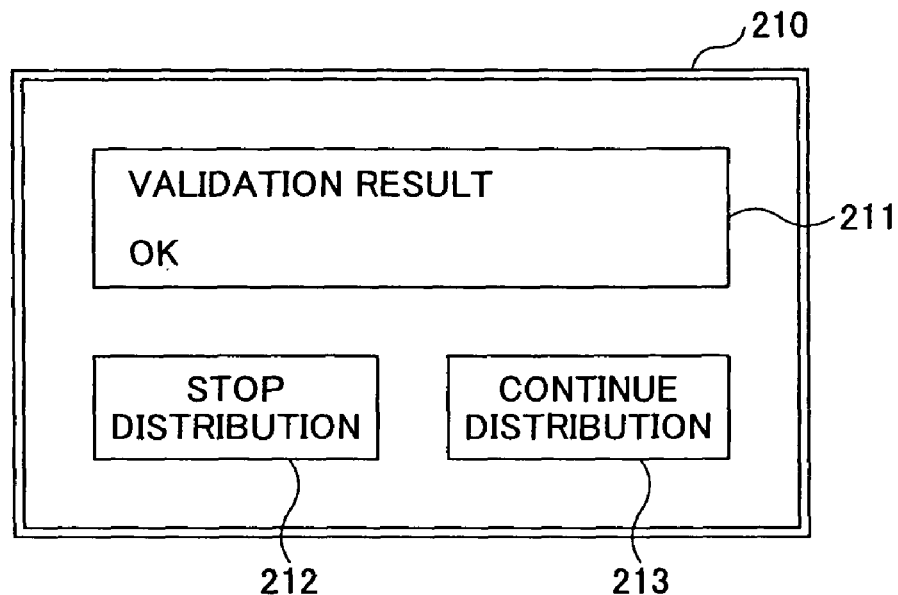
FIG. 6A is a diagram showing display of an operation panel of an image forming device according to a first embodiment.
Figure 6B:
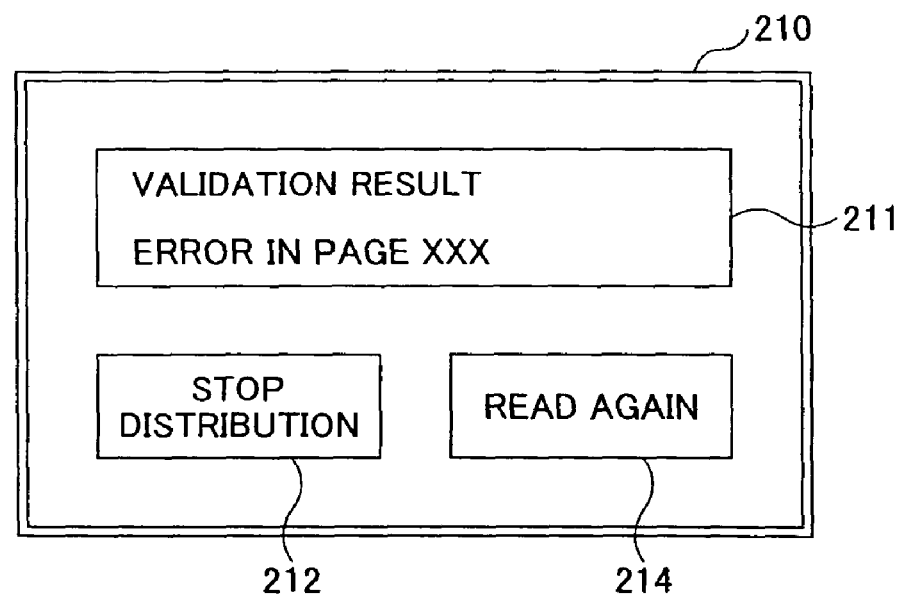
FIG. 6B is a diagram showing display of an operation panel of an image forming device according to a first embodiment.

In the following, display of the operation panel 210 in the image forming device 200 according to the present embodiment is described with reference to FIGS. 6A and 6B. FIGS. 6A and 6B are diagrams showing the display of the operation panel 210 of the image forming device 200 according to the present embodiment.

In S514 of FIG. 5, if validation is normally performed, information notifying that validation is normally performed is displayed on the operation panel 210 of the image forming device 200 as shown in FIG. 6A. In this case, on the operation panel 210, there are displayed a text display area 211 for displaying a validation result, a distribution stop button 212 for stopping distribution of image data, and a continued distribution button 213 for continuing the distribution of image data.

In S514 of FIG. 5, if the validation result is an error, on the operation panel 210 of the image forming device 200, information notifying that the validation result is an error is displayed in the text display area 211 as shown in FIG. 6B. In this case, an image data rereading button 214 is displayed on the operation panel 210 rather than the continued distribution button 213 shown in FIG. 6A.

In the image forming device 200 according to the present embodiment, the MFP application 250 obtains the page number of image data handled as a subject of validation, so that it is possible to display the page number of the image data handled as a subject of validation in the image forming device 200 according to the present embodiment.

In the image forming device 200 according to the present embodiment, when the image data rereading button 214 is pressed in the operation panel 210, it is possible to scan again a paper document corresponding to the image data handled as a subject of validation in the scanning unit 220 so as to read again the paper document as the image data.

Further, in the image forming device 200 according to the present embodiment, as shown in FIG. 6B, the page number of image data whose validation result is an error among the image data handled as a subject of validation may be displayed on the operation panel 210. In this case, in the image forming device 200, when the image data rereading button 214 is pressed again on the operation panel 210, it is possible to scan again the paper document in the scanning unit 220, the paper document corresponding to the image data whose result is an error in the validation. Accordingly, it is possible to read again only the image data whose result is an error in the validation.

In this case, in the image forming device 200, the information obtaining unit 254 of the MFP application 250 is assumed to have obtained information on the page number of the image data whose result is an error in the validation from the information processing device 300. In the image forming device 200, when information for specifying the image data whose result is an error is obtained among the image data handled as a subject of validation from the information processing device 300, it is possible to read again only the image data whose result is an error.

The following describes a case where the validation subject judgment unit 255 of the image forming device 200 judges the distribution flow obtained in S503 to be a distribution flow in which validation is not performed.

Figure 7:
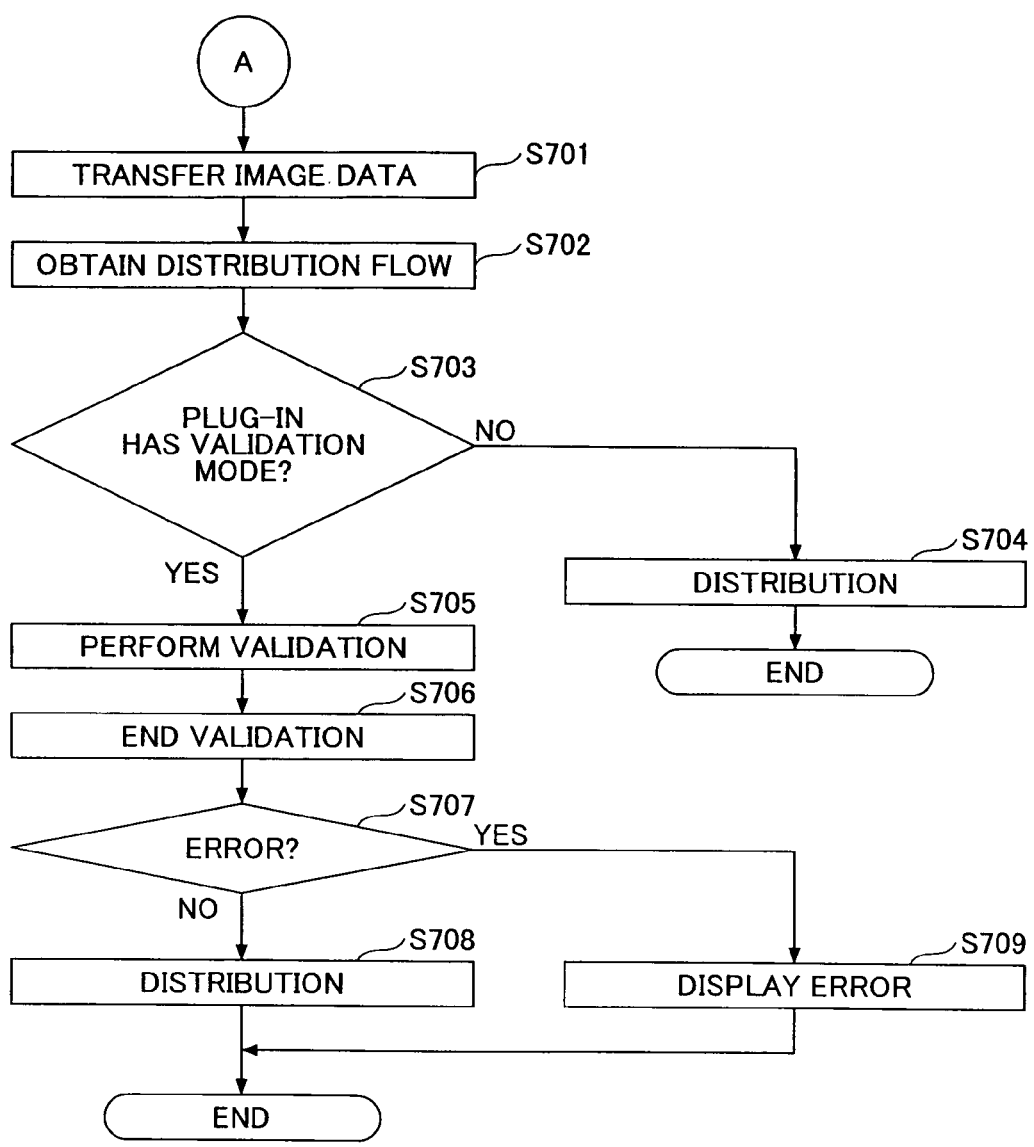
FIG. 7 is a flowchart showing operation when image data handled as a subject of validation is judged to be absent in an image forming device according to a first embodiment.

FIG. 7 is a flowchart showing operation when image data handled as a subject of validation is judged to be absent in the image forming device 200 according to the first embodiment.

In S506 of FIG. 5, when the validation subject judgment unit 255 judges the distribution flow obtained in S503 to be a distribution flow in which validation is not performed, the image forming device 200 causes the image data transfer unit 260 to transfer the image data, destination information, and distribution flow generated in S504 to the information processing device 300 (S701).

In the information processing device 300, the distribution flow transmitted from the image forming device 200 is received (S702).

The distribution flow performing unit 360 judges whether the plug-ins called by the image processing unit 370 upon performing the obtained distribution flow include a plug-in provided with the validation mode (S703). In S703, if the distribution flow performing unit 360 judges that such a plug-in provided with the validation mode is present, various types of plug-ins constituting the image processing unit 370 are called as the validation mode and validation is performed on the image data (S704).

Processes from S705 to S707 and S709 in FIG. 7 are the same as those from S512 to S514 and S517 in FIG. 5, so that description thereof is omitted.

In S707, if the validation is normally performed, the information processing device 300 have obtained all the image data generated in S504 of FIG. 5, so that distribution of the obtained image data is performed by the distribution flow performing unit 360 (S708).

In the present embodiment, the process performed when the obtained distribution flow is judged to be a distribution flow in which validation is not performed in S506 is not limited to the process shown in FIG. 7 and distribution of image data may be performed without judging the presence or absence of the plug-in described in S703, for example.

As mentioned above, in the distribution system 100 including the image forming device 200 and the information processing device 300 according to the present embodiment, it is possible to perform validation on image data before distributing the image data. Accordingly, it is possible to validate whether data for each item of data included in the image data is correctly input.

Further, in the distribution system 100, it is possible to display the page number of image data whose result is an error in the validation on the operation panel 210 of the image forming device 200. Further, it is possible to read again only those image data whose page number is displayed by scanning again. Accordingly, when the validation result is an error, it is not necessary to scan all image data again and the distribution of image data is completed in a reduced time. Further, it is possible to eliminate complicated operation upon reading the image data again, so that operability is improved.

Second Embodiment

Figure 8:
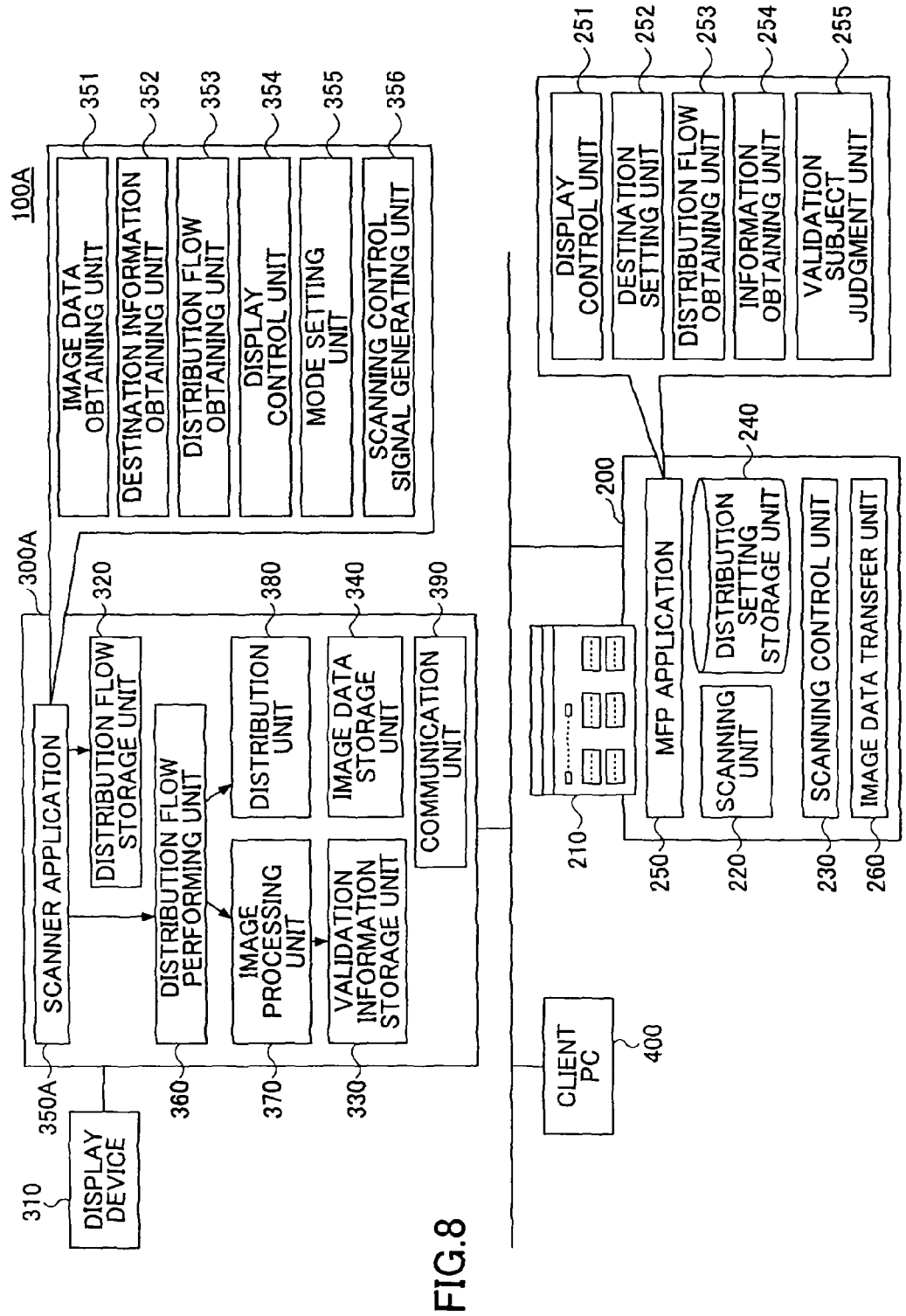
FIG. 8 is a diagram showing a functional configuration of an image forming device and an information processing device constituting a distribution system according to a second embodiment.

In the following, a second embodiment of the present invention is described with reference to the drawings. FIG. 8 is a diagram showing a functional configuration of an information processing device 300A and the image forming device 200 constituting a distribution system 100A according to the second embodiment.

The information processing device 300A according to the present embodiment constituting the distribution system 100A is different from the information processing device 300 according to the first embodiment in that a scanner application 350A includes a scanning control signal generating unit 356. Accordingly, in the following, only the difference from the first embodiment is described and the same reference numerals as in the first embodiment are assigned to elements having the same functional configurations as in the first embodiment, so that description thereof is omitted.

In the distribution system 100A including the information processing device 300A and the image forming device 200 according to the present embodiment, first, only those image data handled as a subject of validation is generated and then whether to generate image data not handled as a subject of validation is determined based on a result of validation.

The scanning control signal generating unit 356 included in the scanner application 350A of the information processing device 300A according to the present embodiment generates a signal for requesting scanning of image data to the image forming device 200. In the image forming device 200 according to the present embodiment, when the scanning request signal is received, the scanning control unit 230 causes scanning unit 220 to perform a scanning process.

Figure 9:
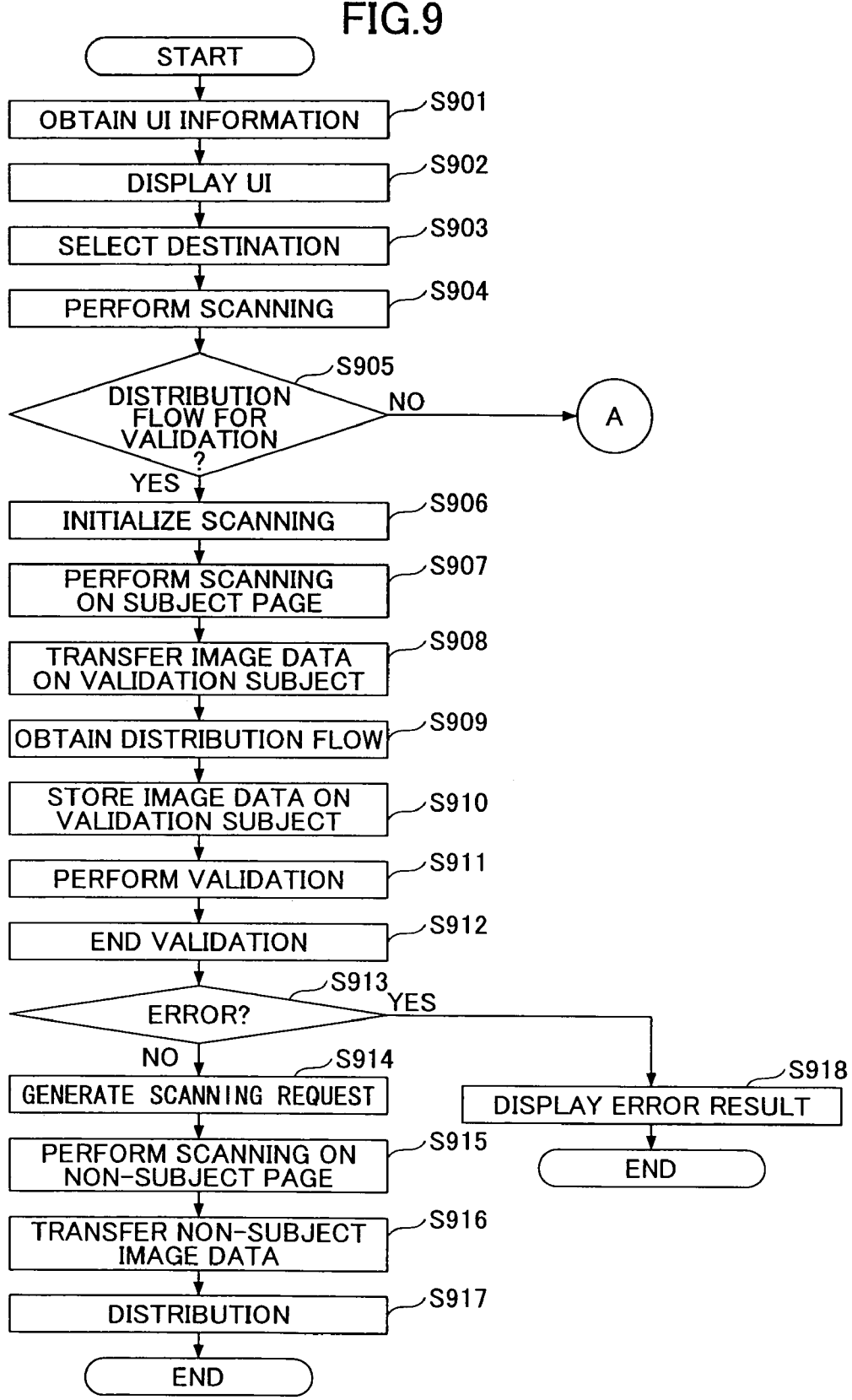
FIG. 9 is a flowchart showing operation of a distribution system including an image forming device and an information processing device according to a second embodiment.

In the following, operation of the distribution system 100A including the image forming device 200 and the information processing device 300A according to the present embodiment is described with reference to FIG. 9. FIG. 9 is a flowchart showing the operation of the distribution system 100A including the image forming device 200 and the information processing device 300A according to the second embodiment.

Processes from S901 to S904 in FIG. 9 are the same as those from S501 to S504 in FIG. 5, so that description thereof is omitted.

When image data is generated in the scanning process by the scanning unit 220 in S904, the MFP application 250 judges whether a distribution flow obtained in S903 is a distribution flow in which validation is performed using the validation subject judgment unit 255 (S905). In this case, the image forming device 200 according to the present embodiment obtains and holds information on a page number of the image data handled as a subject of validation.

In S905, if the distribution flow is judged to be a distribution flow in which validation is not performed, the same process as described in the first embodiment shown in FIG. 7 is performed, so that description is omitted.

In S905, if the distribution flow is judged to be a distribution flow in which validation is performed, the scanning control unit 230 initializes the image data generated in the scanning process in S904 (S906). In this case, the image forming device 200 according to the present embodiment obtains and holds information on a page number of the image data judged to be a subject of validation.

After the initialization of the image data in S906, the scanning control unit 230 causes the scanning unit 220 to scan the image data handled as a subject of validation based on the page number of the image data handled as a subject of validation (S907). In the image forming device 200, when the image data handled as a subject of validation is generated, the MFP application 250 causes the image data transfer unit 260 to transfer the image data to the information processing device 300A (S908).

In the information processing device 300A, the scanner application 350A obtains the image data from the image data obtaining unit 351 and obtains destination information from the destination information obtaining unit 352. The scanner application 350A causes the distribution flow obtaining unit 353 to obtain the distribution flow transmitted from the image forming device 200 (S909). In this case, the scanner application 350A stores the image data handled as a subject of validation in the image data storage unit 340 (S910).

In the information processing device 300A, when the distribution flow of the image data handled as a subject of validation is obtained, each plug-in constituting the image processing unit 370 is called by the distribution flow performing unit 360 and validation is performed (S911). Processes from S911 to S913 in FIG. 9 are the same as those from S512 to S514 in FIG. 5, so that description thereof is omitted.

In S913, if the validation is normally performed, the scanner application 350A causes the scanning control signal generating unit 356 to generate a signal for requesting scanning of image data not handled as a subject of validation to the image forming device 200 (S914). Then, the information processing device 300A transmits the scanning request signal to the image forming device 200 via the communication unit 390.

When the image forming device 200 receives the scanning request signal, the scanning control unit 230 causes the scanning unit 220 to scan the image data not handled as a subject of validation (S915). In the image forming device 200, when the image data not handled as a subject of validation is scanned, the image data transfer unit 260 transfers the image data to the information processing device 300A (S916).

In the information processing device 300A, when the image data not handled as a subject of validation is obtained, the distribution flow performing unit 360 calls the image data handled as a subject of validation stored in the image data storage unit 340. Then, the distribution flow performing unit 360 distributes the image data handled as a subject of validation and the image data not handled as a subject of validation in accordance with the distribution flow (S917) and the distribution process is ended.

In S913, if the validation result is an error (S918), the same process as in S517 in FIG. 5 is performed, so that description thereof is omitted.

As mentioned above, in the distribution system 100A including the image forming device 200 and the information processing device 300A according to the present embodiment, only the image data image data handled as a subject of validation is scanned in the image forming device 200 and whether to scan other image data is determined based on the validation result. In accordance with this, an amount of image data scanned in the image forming device 200 is minimized, so that it is possible to reduce processing load in the distribution system 100A and a period of time until the distribution of the image data is completed.

Further, steps for realizing each function according to the above-mentioned embodiment may be stored in a storage medium as a computer-readable log information management program.

Figure 10:
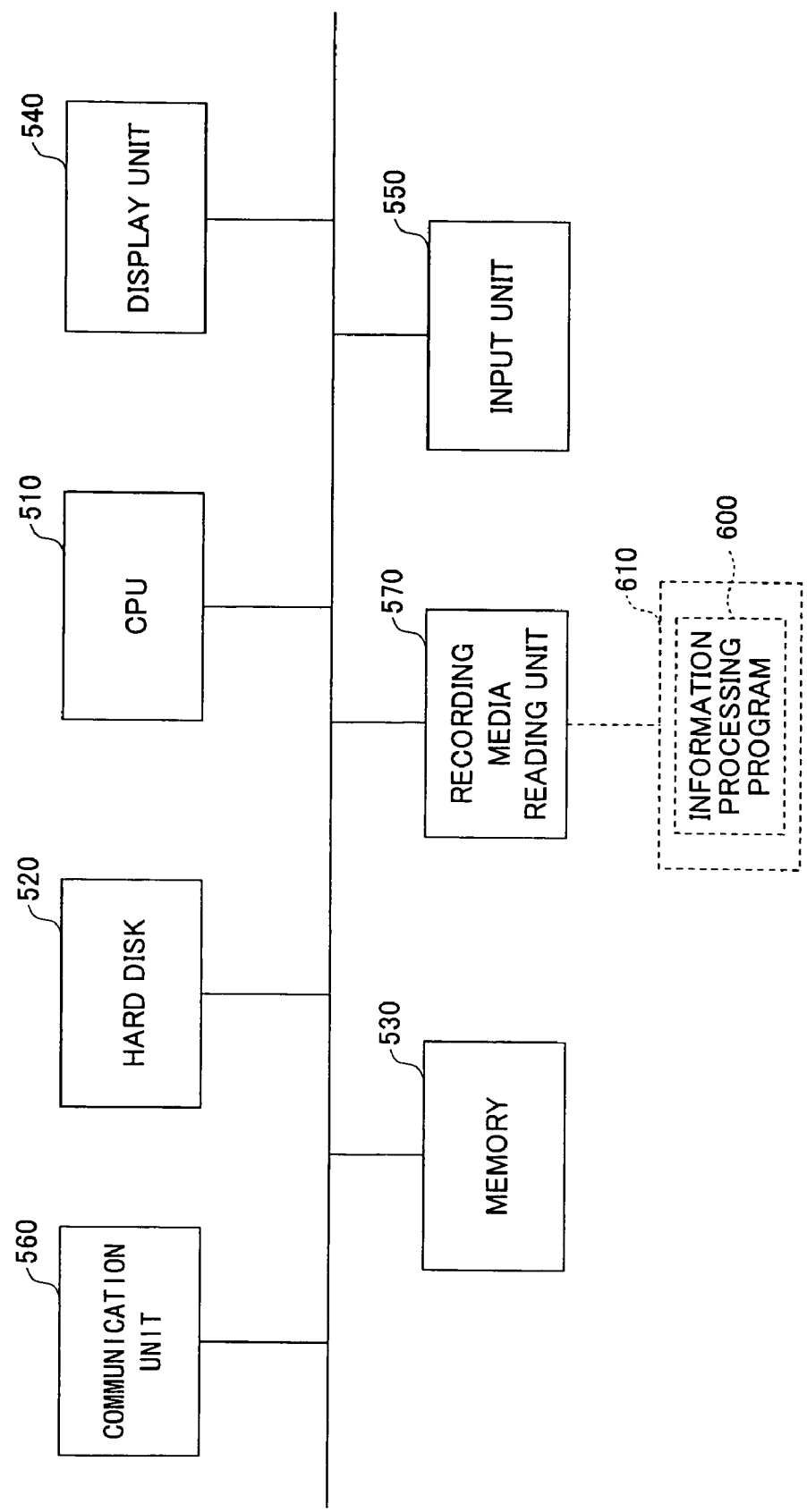
FIG. 10 is a diagram showing a storage medium storing an information processing program for realizing each function in an information processing device of each embodiment.

FIG. 10 is a diagram showing a storage medium storing an information processing program for realizing each function in the information processing device described in each embodiment. The program stored in a storage medium 810 is read and executed in a computer 500 so as to realize each function described in the embodiments.

For example, the computer 500 includes a CPU 510, a hard disk 520, a memory 530, a display unit 540, an input unit 550, a communication unit 560, and a storage media reading unit 570. The CPU 510 is a processing unit and performs an arithmetic operation and a process in the computer 500. The hard disk 520 is a storage unit storing data such as an application operating on the computer 500, data crated by the application, and the like. The memory 530 stores various types of setting values relating to the computer 500 and a result of an arithmetic operation in the CPU 510.

The display unit 540 employs a display displaying data and the like created in the computer 500 so as to allow the user to browse such data. The input unit 550 employs a keyboard or a mouse, for example, and various types of data are input from user operation. The communication unit 560 employs a network control unit, for example, and is used so that the computer 500 performs communication with an external device. The storage media reading unit 570 is for reading data and a program stored in various types of storage media. Examples of the storage media reading unit 570 include a floppy (registered trademark) disk driver and the like.

A storage medium 610 stores a log information management program 600 for realizing each function described in each embodiment. The information management program 600 is read by the storage media reading unit 570 and executed in the CPU 510. The storage medium 610 may be a floppy (registered trademark) disk, a CD-ROM (Compact Disk Read Only Memory), and the like and may be a medium readable in the computer 500. Further, the information management program 600 may be received by the communication unit 560 via a network and may be stored in the hard disk 520 or the like.

It is possible to apply the present invention to an information processing device, an image forming device, an information processing method, and an information processing program for distributing image data.

The present invention is not limited to the specifically disclosed embodiment, and variations and modifications may be made without departing from the scope of the present invention.

The present application is based on Japanese priority application No. 2007-057886 filed Mar. 7, 2007, the entire contents of which are hereby incorporated herein by reference.

What is claimed is:

1. An information processing device connected to an external device having a distribution destination setting unit setting a distribution destination of image data scanned by a scanning unit, the image data including item data indicating an item and data for the item obtained by scanning a paper document by the scanning unit, the information processing device comprising:
   a distribution procedure storage unit configured to store distribution destination information and procedure information corresponding to a distribution destination, the procedure information indicating a procedure that includes receiving the image data and distributing the image data;
   a validation information storage unit configured to store validation information used to validate by determining whether information included in the image data matches the validation information when a distribution procedure is carried out;
   an image information receiving unit configured to receive the image data and the distribution destination information;
   a validation unit configured to validate the information included in the image data received by the image information receiving unit by comparing the information included in the image data to the validation information;
   an image processing unit configured to process the image data based on the distribution procedure information obtained from the distribution destination information received by the image information receiving unit when the information included in the image data is validated by the validation unit; and
   a distribution performing unit configured to distribute the image data processed by the image processing unit based on the distribution destination information if the information included in the image data is validated by the validation unit.

2. The information processing device according to claim 1, wherein
   the validation information stored in the validation information storage unit includes validation item data indicative of items and validation information related to the validation item data,
   and
   the validation unit validates by determining whether the item data in the received image data matches the validation item data included in the validation information.

3. The information processing device according to claim 2, wherein the validation unit validates by determining that the item data in the received image data does not match the information in the received image data when the information related to the item data is blank for the item data or a data format of the information related to the item data does not match the item data.

4. The information processing device according to claim 1, wherein the image processing unit performs each of a plurality of types of image processes on the image data,
   the validation unit validates the information relative to the each of the plurality of types of image processes on the image data based on the validation information, and
   if the validation unit positively validates the information included in the received image data, the image processing unit processes the image data based on the distribution procedure information obtained from the distribution destination information received by the image information receiving unit relative to the each of the plurality of types of image processes on the image data.

5. The information processing device according to claim 1, further comprising:
   a mode setting unit configured to set a distribution mode of distributing the image data without performing the validation or a first validation mode of performing the validation of the image data and the distributing; and
   a performance control unit configured to handle the image data based on the procedure information and control performing distribution,
   wherein the image processing unit performs each of a plurality of types of image processes on the image data,
   operation of the image processing unit includes a normal mode in which the validation by the validation unit is not performed and the image data are processed and a second validation mode in which the validation by the validation unit is performed and the image data are processed,
   the performance control unit, when the distribution mode is set in the mode setting unit, performs distribution of the image data by the distribution performing unit without the validation by the validation unit under the normal mode, and
   the performance control unit, when the first validation mode is set in the mode setting unit, causes the image processing unit to handle the image data based on the procedure information under the second validation mode.

6. The information processing device according to claim 5, wherein the procedure information includes an end of the validation, and the performance control unit causes the image processing unit to handle the image data under the second validation mode until the validation ends based on the end of the validation received from the procedure information.

7. An information processing method of an information processing device connected to an external device having a distribution destination setting unit setting a distribution destination of image data scanned by a scanning unit and including item data indicating an item and data for the item obtained by scanning a paper document by the scanning unit, the information processing device including:

a distribution procedure storage unit configured to store distribution destination information and procedure information corresponding to a distribution destination, the procedure information indicating a procedure that includes receiving the image data and distributing the image data; and a validation information storage unit configured to store validation information used to validate by determining whether information included in the image data matches the validation information when a distribution procedure is carried out, the information processing method comprising the steps of:

receiving the image data and the distribution destination information;

validating the information included in the received image data by comparing the information included in the image data to the validation information;

processing the image data based on the distribution procedure information obtained from the distribution destination information received by the image information receiving unit when the information included in the image data is validated by the validation unit; and distributing the image data processed by the image processing unit based on the distribution destination information if the information included in the image data is validated by the validation unit.

8. The information processing method according to claim 7, wherein the validation information includes validation item data indicative of items and validation information related to the validation item data, the validating the information includes determining whether the item data in the received image data matches the validation item data included in the validation information.

9. The information processing method according to claim 8, wherein the validating includes determining that the item data in the received image data does not match the information in the received image data when the information related to the item data is blank for the item data or a data format of the information related to the item data does not match the item data.

10. The information processing method according to claim 7, further comprising:

obtaining image data not to be handled as a subject of the validation from the external device, wherein the receiving image data includes receiving subject image data to be handled as the subject of the validation among the image data and non-subject image data not to be handled as the subject of validation among the image data.

11. The information processing method according to claim 10, wherein the receiving the image data includes receiving identification information of the external device as a source of the identification information, the obtaining image data includes obtaining the identification information of the external device, and the processing the image data includes processing the image data including the image data to be handled as the subject of the validation and the image data not to be handled as the subject of the validation based on the identification information received by the receiving the image data and the identification information obtained by the obtaining image data.

12. The information processing method according to claim 10, further comprising:

transmitting a request for scanning of the image data not to be handled as the subject of the validation to a scanning unit which performs scanning and is included in the image processing device, wherein the transmitting a request occurs only if the validating positively validates information included in the received image data.

13. The information processing method according to claim 7, wherein the processing the image data includes performing each of a plurality of types of image processes on the image data, the validating the information included in the receiving image data includes validating relative to the each of the plurality of types of image processes on the image data based on the validation information, and if the validating positively validates the information included in the received image data, the processing the image data includes processing based on the distribution procedure information relative to the each of the plurality of types of image processes on the image data.

14. The information processing method according to claim 7 further comprising:

setting either a distribution mode of distributing the image data without performing the validation or a first validation mode of performing the validation of the image data and the distributing, wherein the processing includes performing each of a plurality of types of image processes on the image data, the processing includes a normal mode in which the validating is not performed and the image data are processed, and a second validation mode in which the validating is performed and the image data are processed, when the distribution mode is set, performing the distributing without the validation by the validation unit under the normal mode, and when the first validation mode is set, handling the image data based on the procedure information under the second validation mode.

15. The information processing method according to claim 14, further comprising:

handling the image data under the second validation mode until the validation ends based on an end of the validation included in the procedure information.

16. A non-transitory computer readable medium storing computer-readable information processing program in an information processing device connected to an external device having a distribution destination setting unit setting a distribution destination of image data scanned by a scanning unit and including item data indicating an item and data for the item obtained by scanning a paper document by the scanner, the information processing device including:
- a distribution procedure storage unit configured to store distribution destination information and procedure information corresponding to a distribution destination, the procedure information indicating a procedure that includes receiving the image data and distributing the image data; and
- a validation information storage unit configured to store validation information used to validate by determining whether information included in the image data matches the validation information when a distribution procedure is carried out, causing the computer to perform a process comprising the steps of:
- receiving the image data and the distribution destination information;
- validating the information included in the received image data by comparing the information included in the image data to the validation information;
- processing the image data based on the distribution procedure information obtained from the distribution destination information received by the image information receiving unit when the information included in the image data is validated by the validation unit; and
- distributing the image data processed by the image processing unit based on the distribution destination information if the information included in the image data is validated by the validation unit.

17. The information processing device according to claim 1, further comprising:
- an image data obtaining unit configured to obtain image data not to be handled as a subject of the validation from the external device, wherein the image information receiving unit receives subject image data to be handled as the subject of the validation to be validated by the validation unit among the image data and non-subject image data not to be handled as the subject of validation among the image data.

18. The information processing device according to claim 17, wherein
- the image information receiving unit is configured to receive identification information of the external device as a source of the identification information,
- the image data obtaining unit is configured to obtain the identification information of the external device, and
- an image processing unit is configured to process the image data including the image data to be handled as the subject of the validation and the image data not to be handled as the subject of the validation based on the identification information received by the image information receiving unit and the identification information obtained by the image data obtaining unit.

19. The information processing device according to claim 17, further comprising:
- a scanning request transmitting unit configured to send a request for scanning of the image data not to be handled as the subject of the validation to a scanning unit which performs scanning and is included in the image processing device, the scanning request transmitting unit configured to send the request for scanning if the validation unit positively validates the information included in the received image data.

* * * * *